US011911976B2

(12) United States Patent
Bouhrara et al.

(10) Patent No.: US 11,911,976 B2
(45) Date of Patent: Feb. 27, 2024

(54) SYSTEM FOR IN-SITU CONSOLIDATION AND CURING OF COMPOSITE STRUCTURES

(71) Applicant: SAUDI ARABIAN OIL COMPANY, Dhahran (SA)

(72) Inventors: Mohamed Bouhrara, El Jadida (MA); Turki A. Alomairi, Dammam (SA); Hassan A. Almousa, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 5 days.

(21) Appl. No.: 17/345,424

(22) Filed: Jun. 11, 2021

(65) Prior Publication Data
US 2022/0396039 A1    Dec. 15, 2022

(51) Int. Cl.
*B29C 70/32*    (2006.01)
*B29C 53/56*    (2006.01)
(Continued)

(52) U.S. Cl.
CPC ............ *B29C 70/32* (2013.01); *B29C 53/566* (2013.01); *B29C 33/76* (2013.01); *B29C 53/8016* (2013.01);
(Continued)

(58) Field of Classification Search
CPC ......... B29C 70/32; B29C 33/76; B29C 53/70; B29C 53/66; B29C 53/665; B29C 53/64;
(Continued)

(56) References Cited

U.S. PATENT DOCUMENTS 3,458,146 A * 7/1969 Warner ................. B29D 30/08
156/430
4,028,164 A * 6/1977 Montagut ............ B29C 53/607
156/190

(Continued)

FOREIGN PATENT DOCUMENTS

EP    0463611 A2    1/1992
EP    1771293 B1    8/2010
(Continued)

OTHER PUBLICATIONS

N. Minsch et al.; "Analysis of filament winding processes and potential equipment technologies" Procedia CIRP; vol. 66; 2017; pp. 125-130 (6 pages).
(Continued)

*Primary Examiner* — Scott W Dodds
(74) *Attorney, Agent, or Firm* — Osha Bergman Watanabe & Burton LLP

(57) ABSTRACT

There is disclosed an apparatus for winding filaments to form a structure. The apparatus includes a carrier which mounts spools of fiber, a mandrel, and a guide element which directs fiber tows, comprising filaments from the spools, onto the mandrel. The system further includes a heating element which applies heat to the fiber tows, and a diaphragm element which defines an orifice about the mandrel. The diaphragm element includes one or more displaceable portions which define a physical dimension of the orifice and which: displace to vary the physical dimension of the orifice; and apply a predetermined pressure to the fiber tows disposed on the mandrel. Also disclosed and described is a related method.

11 Claims, 7 Drawing Sheets

(51) Int. Cl.
  *B29C 33/76* (2006.01)
  *B29C 53/82* (2006.01)
  *D04C 3/46* (2006.01)
  *B29C 53/80* (2006.01)
  *B29C 53/84* (2006.01)

(52) U.S. Cl.
  CPC ........ *B29C 53/8041* (2013.01); *B29C 53/821* (2013.01); *B29C 53/845* (2013.01); *D04C 3/46* (2013.01)

(58) Field of Classification Search
  CPC .. B29C 53/566; B29C 53/8016; B29C 53/821
  USPC ........................................................ 156/175
  See application file for complete search history.

(56) References Cited

U.S. PATENT DOCUMENTS

| | | | |
|---|---|---|---|
| 5,256,230 | A | 10/1993 | Winkel |
| 5,266,139 | A | 11/1993 | Yokota et al. |
| H1261 | H | 12/1993 | Gibson et al. |
| 5,320,696 | A | 6/1994 | McConnell et al. |
| 5,763,027 | A | 6/1998 | Enders et al. |
| 7,905,442 | B2 | 3/2011 | Uozumi et al. |
| 10,821,657 | B2 | 11/2020 | Wexler et al. |
| 2010/0052203 | A1* | 3/2010 | Inazawa ................. D04C 3/08 264/103 |
| 2011/0281052 | A1 | 11/2011 | Dewhirst |
| 2020/0139645 | A1 | 5/2020 | Ogale |

FOREIGN PATENT DOCUMENTS

| | | |
|---|---|---|
| EP | 2962833 A1 | 1/2016 |
| EP | 2255950 B1 | 11/2016 |
| JP | H10278120 A | 10/1998 |
| JP | 2008195000 A | 8/2008 |
| JP | 2012152911 A | 8/2012 |
| WO | 2002070232 A1 | 9/2002 |
| WO | 2009060243 A1 | 5/2009 |
| WO | 2010125651 A1 | 11/2010 |
| WO | 2019068813 A1 | 4/2019 |

OTHER PUBLICATIONS

"Trends, advances and innovations in filament winding"; Feb. 10, 2006; pp. 1-9; Retrieved from the Internet: URL: https://www.materialstoday.com/composite-processing/features/trends-advances-and-innovations-in-filament/ (9 pages).

Munro, M. "Review of Manufacturing of Fiber Composite Components by Filament Winding"; Polymer Composites; vol. 9; No. 5; Oct. 1988; pp. 352-359 (8 pages).

Henninger, F., and K. Friedrich. "Thermoplastic filament winding with online-impregnation. Part A: process technology and operating efficiency." Composites Part A: Applied Science and Manufacturing; vol. 33; No. 11; Jan. 28, 2002, pp. 1479-1486. (8 pages).

Sonmez, F. and Hahn, H. "Analysis of the On-Line Consolidation Process in Thermoplastic Composite Tape Placement." Journal of Thermoplastic Composite Materials; vol. 10; Nov. 1, 1997; pp. 543-572 (30 pages).

Lou, D. Y. S. "Online laser curing with preheating of thermoset composites in filament winding;" Advanced Computational Methods in Heat Transfer, Jan. 1, 2002; pp. 425-437 (13 pages).

Quadrini et al.; "Diode Laser Assisted Filament Winding of Thermoplastic Matrix Composites;" Materials; vol. 3; Issue 1; Jan. 20, 2010; pp. 563-571 (9 pages).

* cited by examiner

SYSTEM FOR IN-SITU CONSOLIDATION AND CURING OF COMPOSITE STRUCTURES

BACKGROUND

Filament winding technologies are conventionally used in the production of braided structures which form high-pressure vessels and pipes, particularly to produce composites with a high fiber volume fraction and controlled fiber orientation. Among the prospective applications are storage tanks for Hydrogen Fuel-Cell Vehicles (HFCV). Conventionally, resin-impregnated fibers are wound over a rotating mandrel at a specific orientation, particularly to produce composite elements forming a hollow container shape, e.g., a generally cylindrical external shape. However, the wound structures typically need to be consolidated and cured under high pressure and temperature inside an autoclave, representing a significant impediment to efficient production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an apparatus for winding filaments to form a structure. The apparatus includes a carrier which mounts spools of fiber, a mandrel, and a guide element which directs fiber tows, comprising filaments from the spools, onto the mandrel. The system further includes a heating element which applies heat to the fiber tows, and a diaphragm element which defines an orifice about the mandrel. The diaphragm element includes one or more displaceable portions which define a physical dimension of the orifice and which: displace to vary the physical dimension of the orifice; and apply a predetermined pressure to the fiber tows disposed on the mandrel.

In one aspect, embodiments disclosed herein relate to a method which includes providing a carrier which mounts spools of fiber, providing a mandrel and providing a diaphragm element which defines an orifice about the mandrel. The diaphragm element includes one or more displaceable portions which define a physical dimension of the orifice. The method further includes directing fiber tows, comprising filaments from the spools, onto the mandrel, and applying heat to the fiber tows. Additionally, the method includes displacing the one or more displaceable portions of the diaphragm element to: vary the physical dimension of the orifice; and apply a predetermined pressure to the fiber tows disposed on the mandrel.

In one aspect, embodiments disclosed herein relate to an apparatus for winding filaments to form a structure. The apparatus includes a carrier which mounts spools of fiber, a mandrel, and a guide element which directs fiber tows, comprising filaments from the spools. The apparatus further includes a heating ring which surrounds and is disposed concentrically with respect to the mandrel, and directs heat radially inwardly toward the mandrel. Additionally, the apparatus includes an iris diaphragm which defines an orifice about the mandrel, the iris diaphragm including a plurality of blades which are displaceable in a radial direction with respect to the mandrel and which: displace to vary a diameter of the orifice; and apply a predetermined pressure to the fiber tows disposed on the mandrel. Further, the apparatus includes a bearing element which is concentric with respect to the mandrel and disposed about the mandrel. The bearing element includes a plurality of rollers which contact the fiber tows disposed on the mandrel, after the blades of the iris diaphragm apply the predetermined pressure to the fiber tows.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
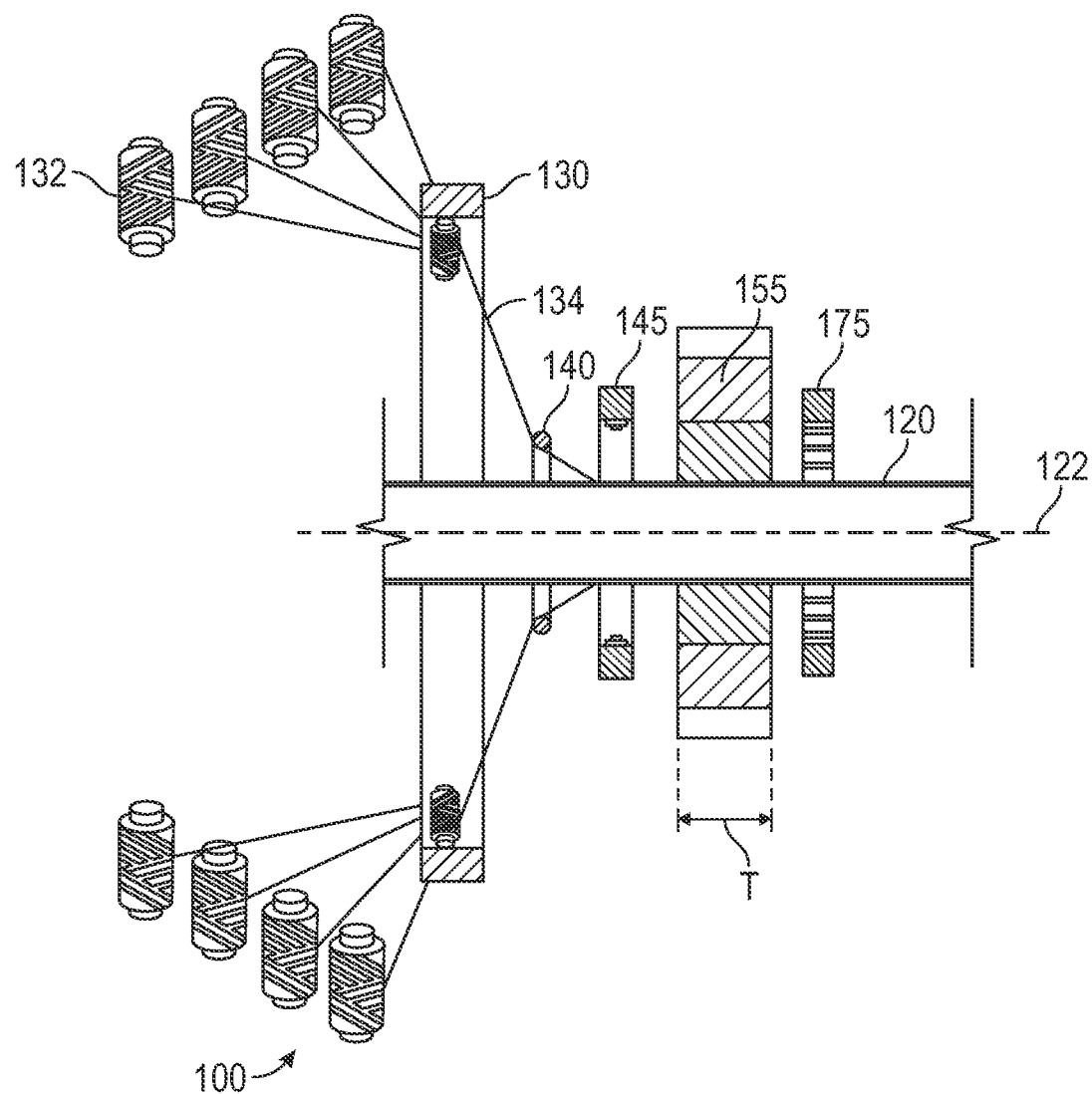
FIG. 1A schematically illustrates, in a side elevational, cross-sectional view, a system for winding filaments to form a structure about a mandrel.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Broadly described and contemplated herein, in accordance with one or more embodiments, are apparatus and processes for in-situ simultaneous consolidation and curing of cylindrical thermoset-based preform structures during multi-filament winding or braiding processes, to produce composite structures having a hollow container shape, e.g., a generally cylindrical or tubular external shape.

Turning now to the figures, it should be noted that the flowchart and block diagrams therein illustrate the architecture, functionality, and operation of possible implementations of systems, apparatuses, methods and computer program products according to one or more embodiments. In this regard, each block in the flowchart or block diagrams may represent a segment, module, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additionally, any block shown in a flowchart and/or block diagram may in instances be regarded as individually dispensable or interchangeable, thus not necessarily dependent on being included with one or more other blocks shown in the same diagram. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

To facilitate easier reference when describing FIGS. 1A through 7, reference numerals may be advanced by a multiple of 100 in indicating a similar or analogous component or element among FIGS. 1A through 7.

Generally, braided structures, such as those formed from carbon-fiber reinforced polymer (CFRP), may be formed by winding filaments from fiber spools about a mandrel. A structure which holds the fiber spools and other components may translate with respect to the mandrel, in order to lay or deposit fiber tows thereupon. At the same time, the mandrel may rotate at a predetermined rate to ensure that the tows from the fiber spools are applied evenly to the mandrel, typically in a plurality of layers progressing radially outwardly with respect to a central axis of the mandrel. In finished form, such structures may be in the form of a hollow container, e.g., they may have a generally cylindrical shape. In accordance with illustrative working embodiments described and contemplated herein, CFRP fibers are used as the filaments to be wound about the mandrel. However, it should be understood that suitable other types of fibers may be used in variant embodiments, such as glass fibers or any of a great variety of advanced, newly developed reinforcement fibers.

Figure 1B:
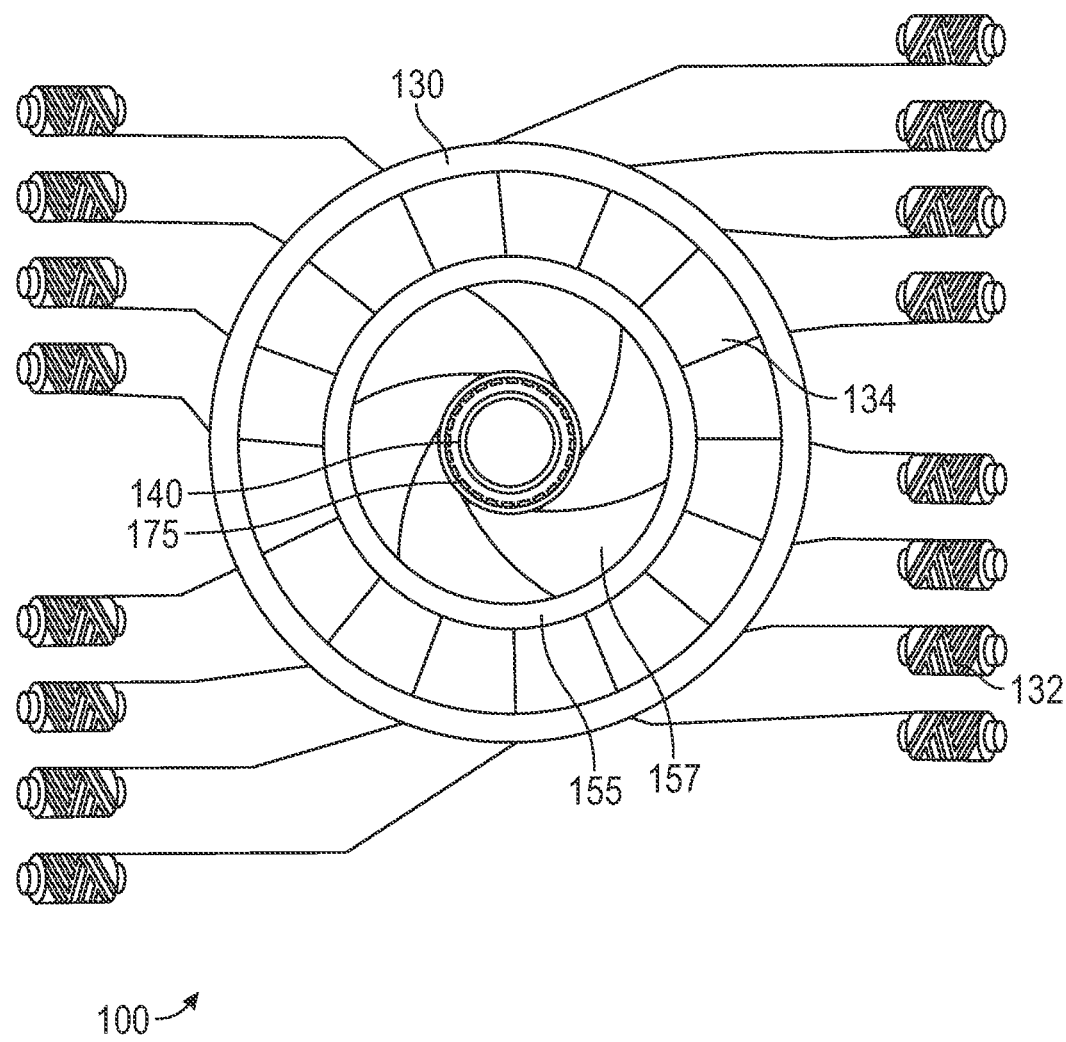
FIG. 1B schematically illustrates the system of FIG. 1A in a front elevational view.

As such, in accordance with one or more embodiments, FIG. 1A schematically illustrates, in a side elevational, cross-sectional view, a system 100 for winding filaments to form a structure about a mandrel 120. Further, FIG. 1B schematically illustrates the system 100 of FIG. 1A in a front elevational view. Continued (joint) reference may be made to both FIGS. 1A and 1B.

In accordance with one or more embodiments, the mandrel 120 may be cylindrical in shape, or may assume a variety of other possible shapes depending on the desired shape of the final product (e.g., hollow container structure); as noted, it may be rotatable about its own central longitudinal axis 122. As shown, a carrier 130 may have a number of spools of fiber 132 mounted thereon. (In both FIGS. 1A and 1B, some spools 132 are shown apart from the carrier 130, merely to facilitate visualization and illustration.) By way of a non-restrictive example, the carrier 130 may be generally annular in shape to surround, and be disposed concentrically about, the mandrel 120. Downstream of the carrier 130 (i.e., in a direction progressing toward the right of the drawing) are several other components which assist in applying and consolidating filaments, or tows 134 from the spools 132 onto the mandrel 120. These components include, but need not necessarily be limited to: a guide element 140, a heating element 150, a diaphragm element 160, and a bearing element 170.

In accordance with one or more embodiments, the mandrel 120 may be rotatably mounted on one or more supports which permit rotation of the mandrel about its central longitudinal axis 122, and the one or more supports may be fixably mounted on a stationary base. At the same time, in order to produce a wound structure via depositing tows 134, or paid-out filaments from the spools 132, onto the rotating mandrel 120, the carrier 130, guide element 140, heating element 150, diaphragm element 160 and bearing element 170 may be suitably mounted on a platform or other common support structure which translates with respect to the mandrel. (Possible implementations of such an arrangement are discussed further below with respect to FIG. 5.) As such, ends of filaments (tows 134) from the spools 132 may initially be "anchored" or otherwise fixedly held at a first end of the mandrel 120 (i.e., at an end toward the right of the drawing), and the carrier 130 (along with elements 140, 150, 160, and 170) may then translate toward the other end of the mandrel 120 (e.g., toward the left of the drawing) in order to pay out the tows 134 toward and onto the mandrel 120 as the mandrel rotates about its own axis.

In accordance with one or more embodiments, and in a manner to be better appreciated herebelow, the heating element 150, diaphragm element 160 and bearing element 170 act on the tows 134 in series and as part of a continuous process as the carrier 130 (along with elements 140 150, 160 and 170) translates with respect to the mandrel 120. However, in accordance with one or more variant embodiments, it is also possible to translate the carrier 130 more than once with respect to the mandrel. Thus, in accordance with such variants, the heating element 150, diaphragm element 160 and bearing element 170 might act on the tows 134 in different "passes" of the carrier 130 translating with respect to the mandrel 120. Also, in accordance with one or more variant embodiments, the mandrel 120 may remain stationary (and not rotate) while the carrier 130 rotates about the mandrel 120, to deposit tows 134 onto the mandrel 120.

In accordance with one or more embodiments, tows (i.e., individual filaments) 134 from the spools 132 may be fed through the guide element 140 toward the mandrel 120, to be wound about the mandrel 120 (as the mandrel 120 rotates about its own axis 122), and toward in-situ consolidation and curing as broadly contemplated herein. As such, heating element 145 may heat the tows 134 at a predetermined temperature (i.e., to thermally prepare the tows 134 for consolidation) as they are fed onto, and contact, the mandrel 120. The guide element 140 and heating element 145 may each be in the form of a ring which is generally annular in shape to surround, and be disposed concentrically about, the mandrel 120. Further, heating element 145 can be suitably embodied to provide a consistent temperature at the predetermined level in energy-efficient manner (e.g., via heating which is directed or halogen-based).

Figure 2:
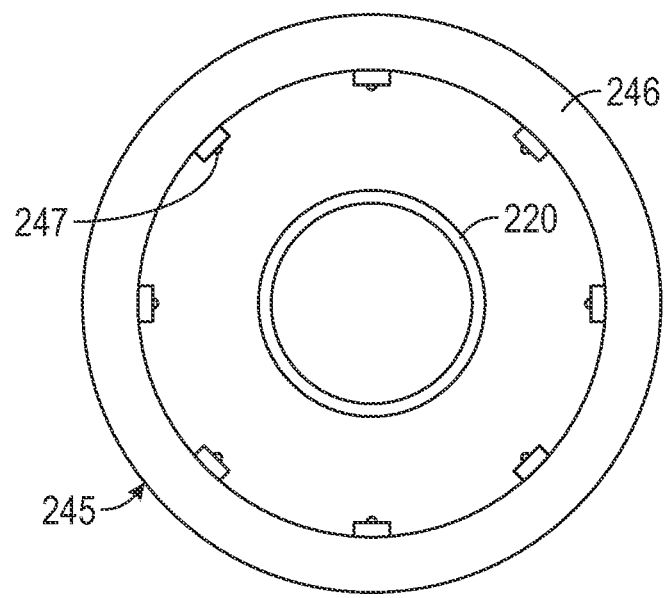
FIG. 2 schematically illustrates, in front elevational view, a first implementation of a heating element, in accordance with one or more embodiments.

FIG. 2 schematically illustrates, in front elevational view, a first possible implementation of a heating element 245, in accordance with one or more embodiments. As shown, heating element 245 may be embodied by a ring 246 which surrounds and is concentric with a mandrel 220. At a radially inward portion of the ring 246, a plurality of individual directed heating sources 247 may be provided. By way of illustrative and non-restrictive examples, such directed heating sources 247 may be embodied by heated air flow sources, or by heated coils that operate via through thermal conduction or induction to heat the mandrel 220 (and the wound tows disposed thereupon).

Figure 3:
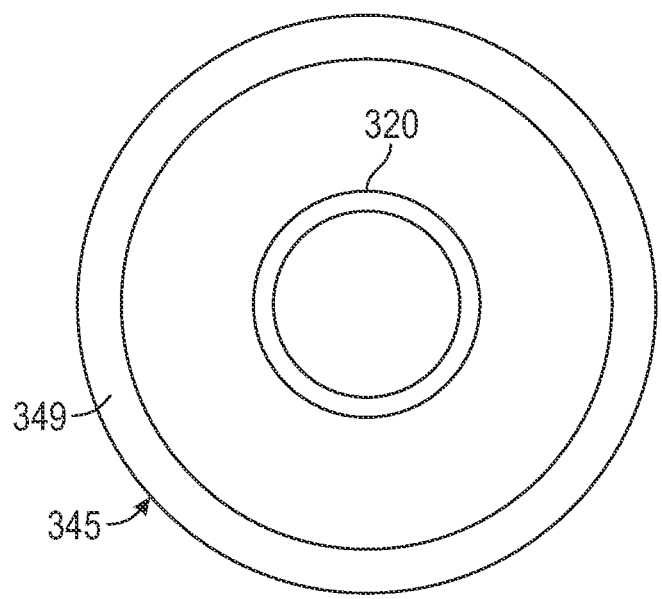
FIG. 3 schematically illustrates, in front elevational view, a second implementation of a heating element, in accordance with one or more embodiments.

FIG. 3 schematically illustrates, in front elevational view, a second possible implementation of a heating element 345, in accordance with one or more embodiments. As shown, heating element 345 may be embodied by a continuous halogen tube 349 which surrounds and is concentric with a mandrel 320. It should be understood that the heating elements 245, 345 shown in FIGS. 2 and 3 are merely provided as illustrative and non-restrictive examples, and that a great variety of other possible implementations of a heating element are also conceivable.

As generally known, and with reference again to FIGS. 1A and 1B, a "consolidation" step promotes adhesion to the mandrel 120 and prevents the formation of voids that could otherwise jeopardize mechanical properties of the wound structure being formed. Here, in accordance with one or more embodiments, consolidation is effected by imparting a fiber tension in-situ. To this end, a diaphragm element 155 may be included downstream of the heating element 145. The diaphragm element 155 may be embodied by an iris diaphragm structure that surrounds and is concentric with respect to the mandrel 120, and may include a plurality of displaceable portions 157. The displaceable portions 157 may be in the form of iris diaphragm blades that selectively displace, e.g., in a manner to open and close at a predetermined rate and to apply a predetermined pressure to fiber tows 134 wound about the mandrel 120. Accordingly, as the wound structure (comprising fiber tows 134 wound about the mandrel 120) is passed through the displaceable portions 157, the displacement (or opening and closing) of the displaceable portions 157 can firmly consolidate the wound tows 134 along the length of the mandrel 120.

In accordance with one or more embodiments, the displaceable portions (e.g., iris diaphragm blades) 157 may be mounted and actuated to displace essentially in any suitable manner. Generally, the portions/blades 157 may be connected with each other mechanically to define a physical dimension of an orifice defined radially inwardly from the portions/blades 157 (with respect to the mandrel axis 122). Further, displacement of the portions/blades 157 serves to vary the physical dimension of the orifice, e.g., to define the diameter of a related circle. Thus, the diameter of the orifice can be increased or reduced selectively.

In accordance with one or more embodiments, there are several conceivable ways to effect opening/closing of the displaceable portions 157. For instance, individual portions/blades 157 can be connected mechanically, e.g., via an outer ring, whereby rotational motion of the outer ring prompts movement of the portions/blades 157 in a radially inward or radially outward direction. Related mechanical actuation can be provided via an electrical motor, a hydraulic-based system or a pressure-based system, just by way of illustrative examples.

In accordance with one or more embodiments, in controlling the displacement of portions/blades 157 in the diaphragm structure 155, the relative translational speed between the mandrel 122 and diaphragm structure 155 can be taken into account, thereby ensuring complete consolidation of the wound tows 134 along the length of the mandrel 122. This will help ensure that the portions/blades 157 displace radially inwardly to consolidate a portion of the wound tows 134 on mandrel 122, then retract radially outwardly as relative translational movement of the diaphragm structure 155 and mandrel 122 continues. The portions/blades 157 can then again displace radially inwardly to consolidate the wound tows 124 at a different axial location along mandrel 122. An associated protocol or algorithm can govern related actuation of the portions/blades 157; e.g., among the inputs to such a protocol or algorithm can be a detected or calculated position of the mandrel 122 with respect to the diaphragm structure 155.

Also, in accordance with one or more embodiments, the portions/blades 157 themselves may be of suitable dimension to consolidate the wound tows 134 on the mandrel 120 in the context of a general process as broadly contemplated herein. Thus, the portions/blades 157 may be relatively thick in comparison with the wound tows 134. By way of an illustrative and non-restrictive example, the portions/blades 157 may have a thickness dimension T of between about 10 mm and 100 mm.

In accordance with one or more embodiments, when the portions/blades 157 apply a "predetermined pressure" to the wound tows 134, it should be appreciated that this can also be governed by the geometry of the wound tows 134, and the number of stacked layers of the tows 134. This can help prevent the development of deformities and, e.g., can help push out any air bubbles that may exist between the layers of wound tows 134, thereby ensuring that the layers are in close enough contact to impart stronger mechanical properties after curing. Generally, the pressure applied to wound tows 134 may be determined in any suitable manner but, e.g., could be greater than or equal to 1 bar or even in a range of about 2.5 to about 10 bar; in some cases, this value could be even higher.

In accordance with one or more embodiments, downstream of the diaphragm element 155, a bearing element 175 may be provided. Bearing element 175 may be embodied by an annular member, e.g., a needle bearing ring, that is disposed concentrically about the mandrel 120. Bearing element 175 may define an adjustable inner diameter and may itself rotate about the central axis of the mandrel 120, e.g., in a direction opposite to the rotation of mandrel 120.

Figure 4A:
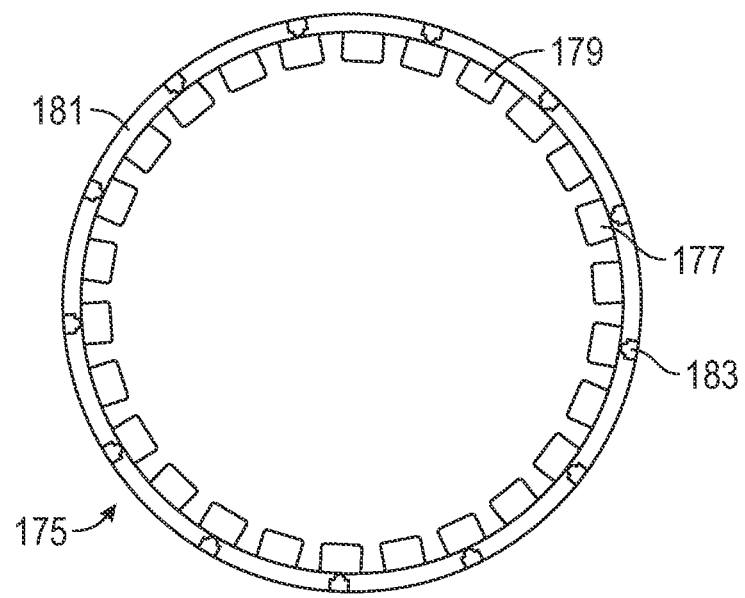
FIG. 4A schematically illustrates, in front elevational view, a bearing element from FIGS. 1A and 1B, in accordance with one or more embodiments.
Figure 4B:
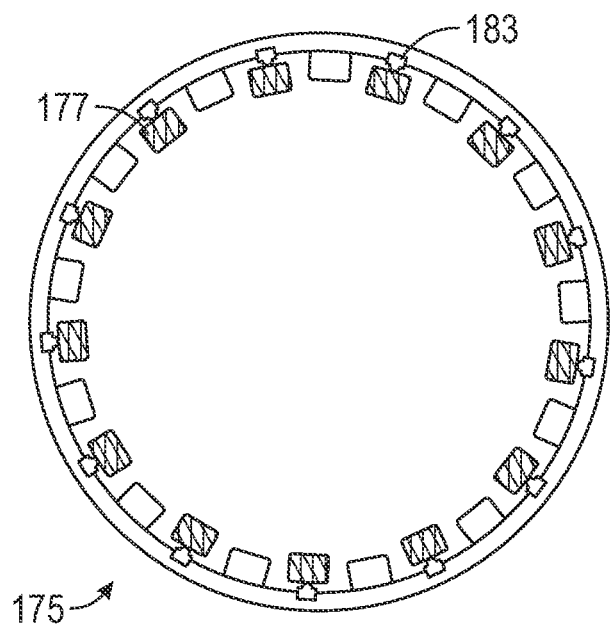
FIG. 4B is essentially the same view as FIG. 4A but showing the deployment of individual roller elements, in accordance with one or more embodiments.

FIG. 4A schematically illustrates, in front elevational view, the bearing element 175 from FIGS. 1A and 1B, in accordance with one or more embodiments. Further, FIG. 4B is essentially the same view as FIG. 4A but showing the deployment of individual roller elements. It should be understood that the bearing element 175 shown in FIGS. 4A and 4B is merely provided as an illustrative and non-restrictive example, and that a great variety of other possible implementations of a bearing element are also conceivable. As such, reference may continue to be made to FIGS. 1A, 1B, 4A and 4B.

In accordance with one or more embodiments, bearing element 175 may include individual roller elements 177, 179 which are mounted on an outer mounting ring 181 and extend radially inwardly therefrom. As such, there may be two sets of roller elements; those that are radially displaceable (177) and those that are not (179). Those that are radially displaceable (177) may each be actuable via an adjustable load or mount 183 such that, e.g., in response to a given signal or electrical impulse, they will deploy in a radially inward direction to readjust an effective inner diameter of the bearing element 175 (i.e., the adjustable inner diameter as aforementioned). FIG. 4A shows the radially displaceable rollers 177 retracted in a radially outward direction to essentially match a radial position of the rollers 179 that are not radially displaceable. FIG. 4B, for its part, shows the radially displaceable rollers 177 deployed such that they extend a predetermined radial distance inwardly.

In accordance with one or more embodiments, the displaceable roller elements 177 can contact the wound tows 134 to help uniformly consolidate the wound tows 134. Such radial displacement of the roller elements 177 may be actuated via an alternating, adjustable load (e.g., via a varying magnetic field or electrical current, and/or via a hydraulic system). As such, by including some rollers that are displaceable (177) and some that are not (179), it can be appreciated that the displaceable rollers (177) can be extended radially inwardly to contact and consolidate wound tows 134 at a portion of the overall wound structure that may be smaller in diameter (with respect to a longitudinal axis of the mandrel 120), and then may retract to accommodate portions of the wound structure that are larger in diameter. The non-displaceable rollers 179 may then contact and help consolidate the wound tows 134, along with the displaceable rollers 177, at one or more portions of the overall wound structure that are larger in diameter.

As such, in accordance with one or more embodiments, after the wound tows 134 are initially consolidated via the diaphragm element 155, bearing element 175 can be transited (e.g., counter-rotated) over the wound (and consolidated) tows 134 to enhance consolidation quality, e.g., by ensuring uniform and consistent consolidation. The individual roller elements (e.g., 177 and/or 179), in that posture, will contact the layered, composite wound structure (built from tows 134) and permit the rollers 177 (and/or 179) to roll in a circumferential direction with respect to mandrel 120. Because there is continued relative translational movement between the mandrel 120 and bearing element 175, the effect is for the roller elements to run in a direction which essentially is perpendicular to the angular lie of the wound tows 134, thereby ensuring optimal consolidation of composite layers formed by the tows 134 on mandrel 120.

In accordance with one or more embodiments, the displaceable roller elements 177 may displace radially inwardly in essentially any suitable manner, e.g., via each being mounted on a radially displaceable support rod. Other parameters can be set, governed and/or optimized in any manner deemed suitable, e.g., the speed of rotation of the bearing element 175, as well as the adjustable inner diameter effectively set by the displaceable roller elements 177 and the pressure applied thereby. These, e.g., may be tied to the dimensions of the wound structure being formed and the materials used, among other possible inputs.

Figure 5:
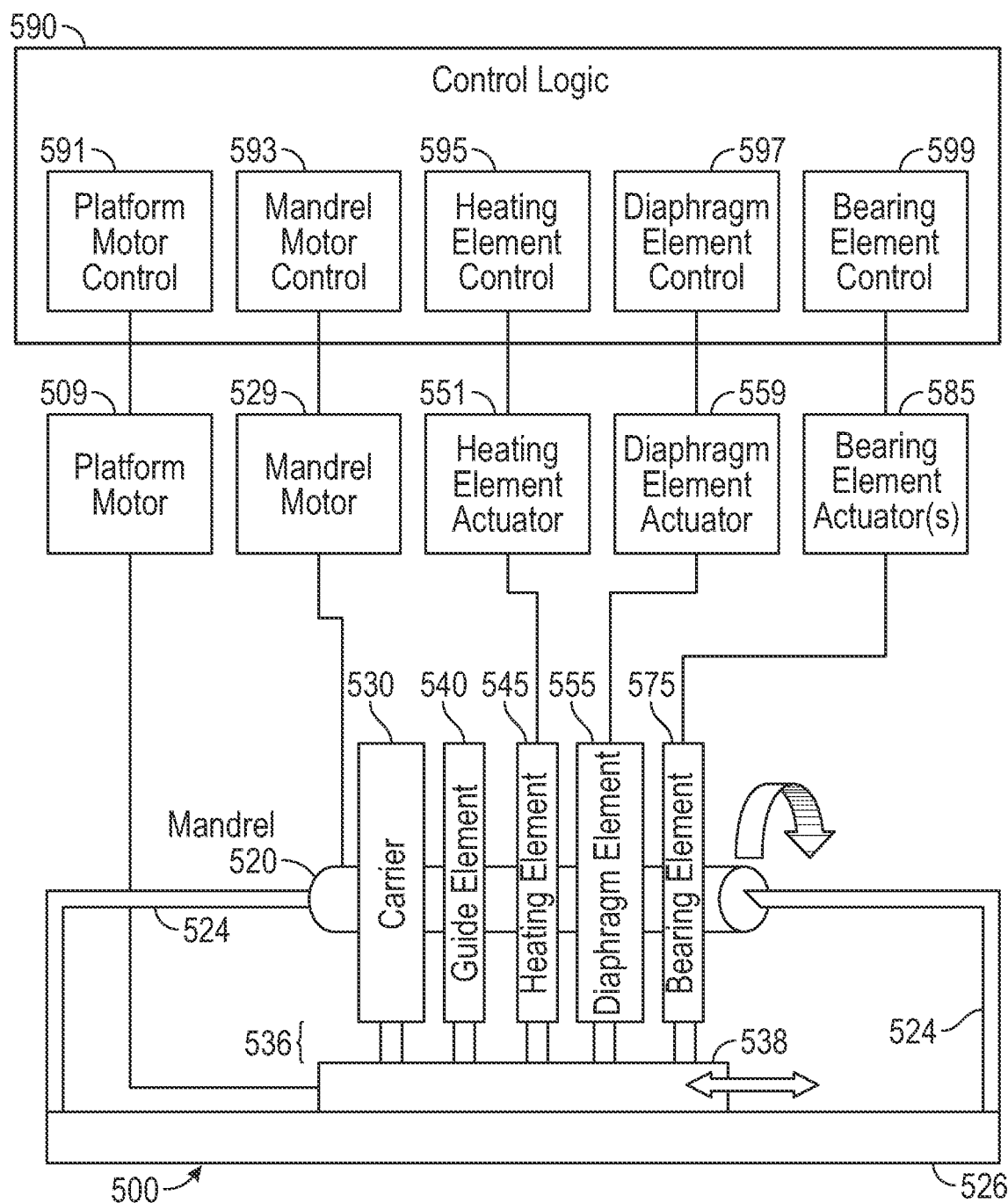
FIG. 5 schematically illustrates a system for winding filaments to form a structure, including related general components, in accordance with one or more embodiments.

FIG. 5 schematically illustrates a system 500 for winding filaments to form a structure, including related general components, in accordance with one or more embodiments. It should be appreciated that components described and illustrated with respect to FIG. 5 may be employed in connection with any and all working examples described and illustrated herein.

As shown in FIG. 5, a mandrel 520 is provided which may be rotatably mounted on one or more supports 524. The one or more supports 524 may be fixably mounted on a stationary base 526. (Two such supports 524 are shown in FIG. 5, one at each axial end of the mandrel 520.) A number of spools of fiber (not otherwise illustrated in FIG. 5) may be mounted on a carrier 530 which surrounds and is disposed concentrically about the mandrel 520. Downstream of the carrier 530 (i.e., in a direction progressing toward the right of the drawing) are several other components which assist in applying and consolidating filaments from the carrier 530 onto the mandrel 520. These components include, but need not necessarily be limited to: a guide element 540, a heating element 545, a diaphragm element 555 and a bearing element 575.

In accordance with one or more embodiments, in order to produce a wound structure via depositing tows, or paid-out filaments from the spools on the carrier and onto the rotating mandrel 520, the guide element 540, heating element 545, diaphragm element 555 and bearing element 575 may be mounted (e.g., via suitable support elements 536) on a platform or other common support structure 538 which translates (i.e., moves left and right with respect to the drawing) relative to the mandrel 520. Thus, the platform or other common support structure 538 may be mounted on one or more rails fixably mounted to the stationary base, and/or in one or more grooves disposed within the base, etc. A process of winding filaments to form a container structure may then be undertaken as described elsewhere herein.

In accordance with one or more embodiments, a number of components may also be provided to control and actuate various elements of the system 500. As shown, a suitable motor 509 may be provided to translate the platform 538 with respect to stationary base 526. Likewise, a suitable motor 529 may be provided to rotationally drive the mandrel 520. The heating element may be actuated by a suitable component (551), e.g., a switching mechanism or the like, which selectively activates, deactivates or otherwise governs the action of the one or more components of heating element 545 which radiate heat toward the mandrel 520. A suitable actuator 559 may be provided to actuate (e.g., displace) one or more components of the diaphragm element 555, such as the displaceable portions or blades discussed herein. For instance, as noted further above, mechanical actuation here could be provided by an electric motor, hydraulic-based system or a pressure-based system. Additionally, one or more suitable actuators 585 can be provided for the bearing element 575. As noted previously, such actuation could involve providing a signal or electrical impulse to one or more adjustable loads or mounts on the bearing element 575 itself; together, these may be regarded as components as an actuation system 585 for the bearing element 575.

In accordance with one or more embodiments, the aforementioned motors and actuators may be controlled via components of general control logic 590. Suitably, control logic 590 may include modules or code (591, 593, 595, 597 and 599, respectively) for controlling the platform motor 509, mandrel motor 529, heating element actuator 551, diaphragm element actuator 559 and bearing element actuator(s) 585. The individual components of control logic 590 may act independently or interdependently, as may be appropriate for the needs and objectives of the system 500 at hand. Control logic 590 may be a component of a computer such as that illustrated (at 802) in FIG. 7.

Figure 6:
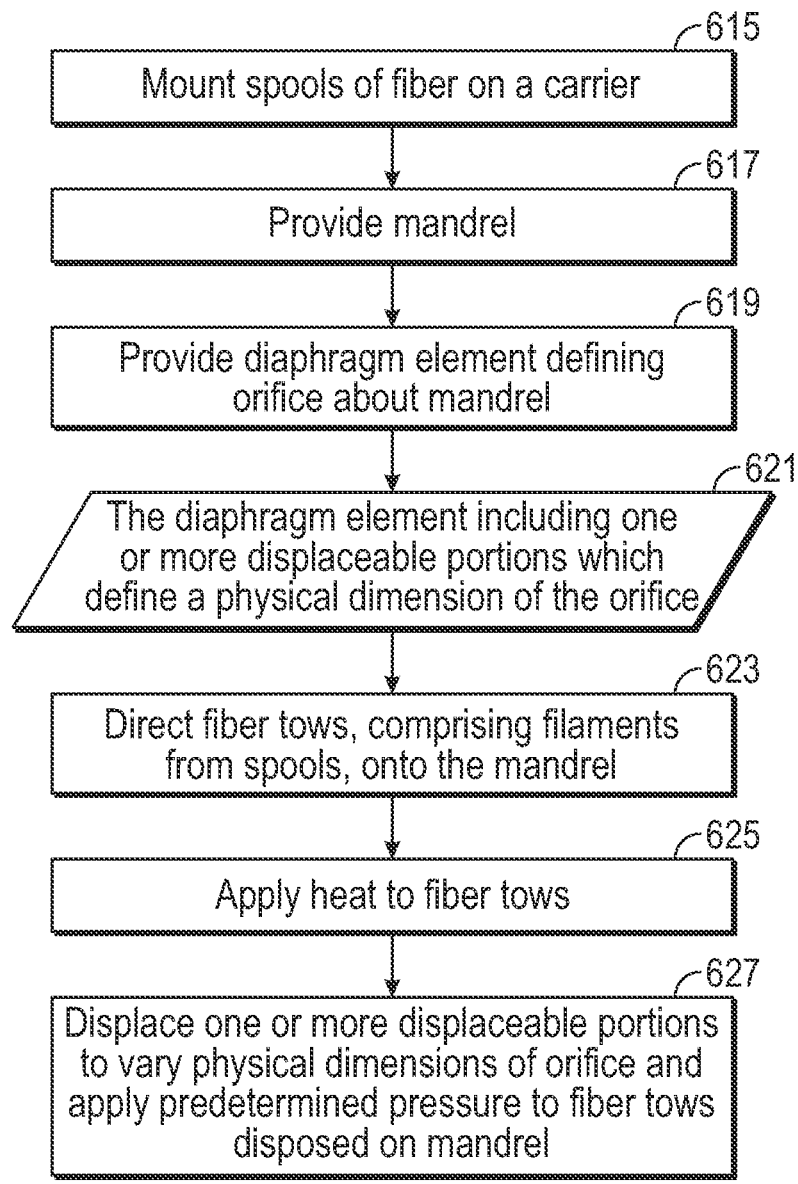
FIG. 6 shows a flowchart of a method in accordance with one or more embodiments.

It can be appreciated from the foregoing that, in accordance with one or more embodiments, methods of winding filaments to form a structure are broadly contemplated, as illustrated in the flowchart of FIG. 6. As such, spools may be mounted on a carrier (615). A mandrel may be provided (617), along with a diaphragm element which defines an orifice about the mandrel (619). The diaphragm element includes one or more displaceable portions which define a physical dimension of the orifice (621). Fiber tows, comprising filaments from the spools, are directed onto the mandrel (623). Heat is applied to the fiber tows (625), and the one or more displaceable portions of the diaphragm element are displaced to vary the physical dimension of the orifice and apply a predetermined pressure to the fiber tows disposed on the mandrel (627).

As can be appreciated from the foregoing by those of ordinary skill in the art, one or more embodiments as broadly contemplated herein combine a filament winding step with final curing in a manner that presents huge efficiency gains over conventional setups. Among the favorable results, in a context of manufacturing multi-filament or braided structures, are: a capability of increasing winding speed; and structural uniformity imparted through in-situ steps of consolidation and post-consolidation, via the diaphragm element and bearing element (e.g., iris diaphragm and needle bearing ring) which can approach the wound structure from all sides. Additional advantages include reduced manufacturing cycle times and increased production capacity.

Figure 7:
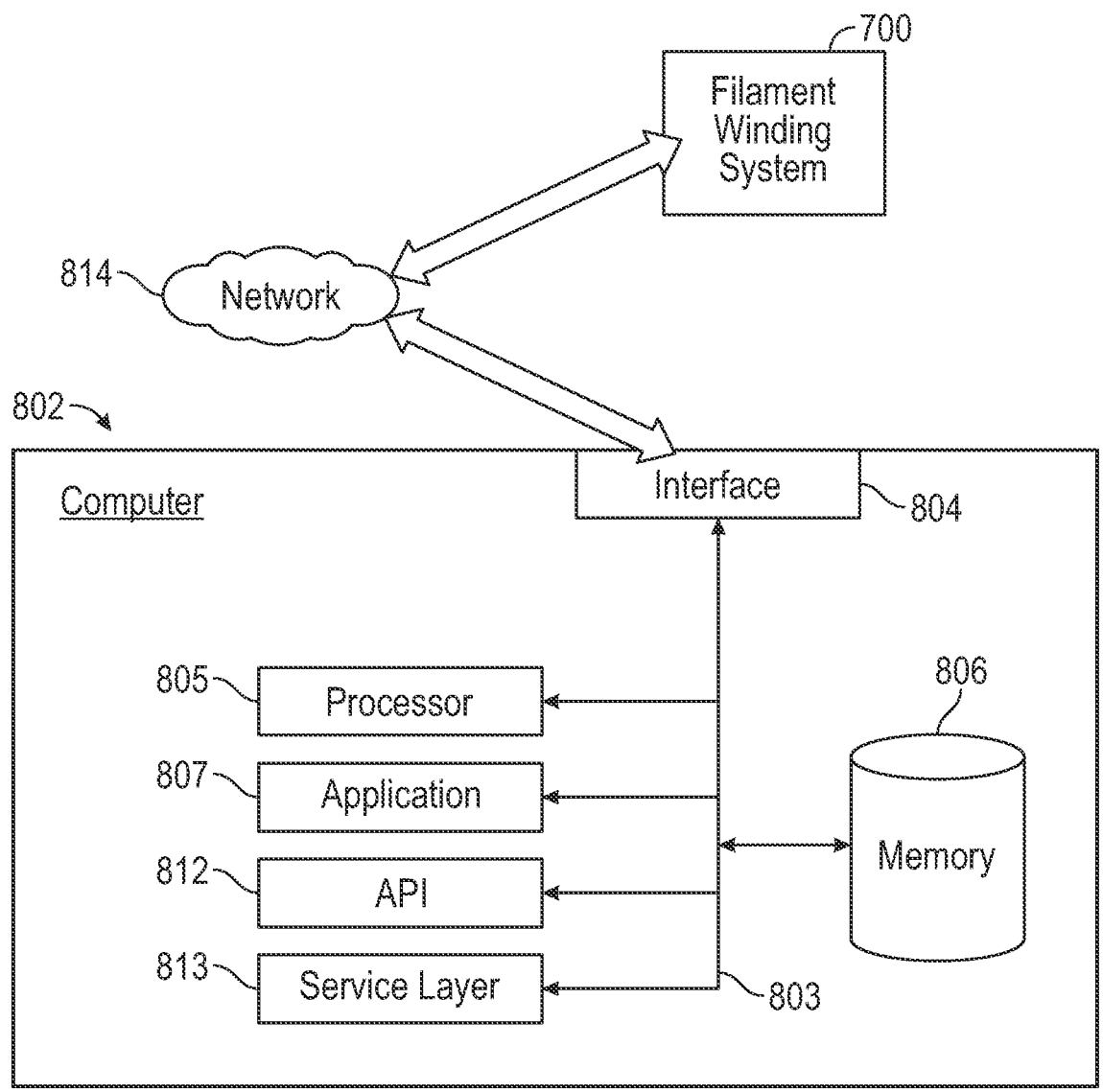
FIG. 7 schematically illustrates a computing device and related components, in accordance with one or more embodiments.

FIG. 7 schematically illustrates a computing device and related components, in accordance with one or more embodiments. As such, FIG. 7 generally depicts a block diagram of a computer system 802 used to provide computational functionalities associated with described algorithms, methods, functions, processes, flows, and procedures as described in this disclosure, according to one or more embodiments. In this respect, computer 802 may interface with a filament winding system 700 similar or analogous, e.g., to system 500 in FIG. 5, either directly (e.g., via hard-wired connection) or over an internal or external network 814. Further, control logic such as that indicated at 590 in FIG. 5 may be housed in computer 802, or may be housed or stored elsewhere in a manner to be controlled or communicated with by computer 802. As such, if housed in computer 802, such control logic may reside in application 807 as discussed herebelow while utilizing other components such as processor 805 and memory 806, whose functionality will be better appreciated herebelow.

In accordance with one or more embodiments, the illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 802 may include a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 814. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 814 from a client application (for example, executing on another computer 802) and responding to the received requests by processing the said requests in an appropriate software application. In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813. The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or another suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 7, two or more interfaces 804 may be used according to particular needs, desires, or particular implementations of the computer 802. The interface 804 is used by the computer 802 for communicating with other systems in a distributed environment that are connected to the network 814. Generally, the interface 804 includes logic encoded in software or hardware (or a combination of software and hardware) and operable to communicate with the network 814. More specifically, the interface 804 may include software supporting one or more communication protocols associated with communications such that the network 814 or interface's hardware is operable to communicate physical signals within and outside of the illustrated computer 802.

The computer 802 includes at least one computer processor 805. Although illustrated as a single computer processor 805 in FIG. 7, two or more processors may be used according to particular needs, desires, or particular implementations of the computer 802. Generally, the computer processor 805 executes instructions and manipulates data to perform the operations of the computer 802 and any algorithms, methods, functions, processes, flows, and procedures as described in the instant disclosure.

The computer 802 also includes a memory 806 that holds data for the computer 802 or other components (or a combination of both) that can be connected to the network 814. For example, memory 806 can be a database storing data consistent with this disclosure. Although illustrated as a single memory 806 in FIG. 7, two or more memories may be used according to particular needs, desires, or particular implementations of the computer 802 and the described functionality. While memory 806 is illustrated as an integral component of the computer 802, in alternative implementations, memory 806 can be external to the computer 802.

The application 807 is an algorithmic software engine providing functionality according to particular needs, desires, or particular implementations of the computer 802, particularly with respect to functionality described in this disclosure. For example, application 807 can serve as one or more components, modules, applications, etc. Further, although illustrated as a single application 807, the application 807 may be implemented as multiple applications 807 on the computer 802. In addition, although illustrated as integral to the computer 802, in alternative implementations, the application 807 can be external to the computer 802.

There may be any number of computers 802 associated with, or external to, a computer system containing computer 802, wherein each computer 802 communicates over network 814. Further, the term "client," "user," and other appropriate terminology may be used interchangeably as appropriate without departing from the scope of this disclosure. Moreover, this disclosure contemplates that many users may use one computer 802, or that one user may use multiple computers 802.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. An apparatus for winding fiber tows to form a structure, the apparatus comprising:
   a carrier with spools of fiber mounted thereon, wherein the spools of fiber provide the fiber tows to form the structure;
   a mandrel;
   a guide element that directs the fiber tows from the spools of fiber onto the mandrel;
   a heating element that applies heat to the fiber tows; and
   a diaphragm element that defines an orifice about the mandrel;
   the diaphragm element including one or more displaceable portions that define a physical dimension of the orifice and that selectively displace to:
     open and close at a predetermined rate to vary the physical dimension of the orifice; and
     apply a predetermined pressure to the fiber tows disposed on the mandrel; an actuator that actuates the one or more displaceable portions; and
   control logic that controls the actuator to selectively open and close the one or more displaceable portions as the mandrel and the diaphragm element undergo relative translational displacement with respect to one another;
   wherein the control logic, in controlling the actuator to selectively open and close the one or more displaceable portions, takes into account a relative translational speed between the mandrel and the diaphragm element, via inputs comprising a detected or calculated position of the mandrel with respect to the diaphragm structure.

2. The apparatus according to claim 1, wherein the displaceable portions of the diaphragm element define a diameter of the orifice.

3. The apparatus according to claim 1, wherein:
   the diaphragm element comprises an iris diaphragm; and
   the one or more displaceable portions comprise blades that are displaceable in a radial direction with respect to the mandrel.

4. The apparatus according to claim 1, further comprising:
   a bearing element that is concentric with respect to the mandrel and disposed about the mandrel;
   wherein the bearing element includes one or more rollers that contact the fiber tows disposed on the mandrel, after the displaceable portions of the diaphragm element apply the predetermined pressure to the fiber tows.

5. The apparatus according to claim 4, wherein:
   the bearing element comprises an outer ring, wherein the one or more rollers are mounted on the outer ring; and
   the one or more rollers are displaceable along a radially inward direction from the outer ring, to contact the fiber tows disposed on the mandrel.

6. The apparatus according to claim 5, wherein the outer ring is rotatable in a direction perpendicular to a central longitudinal axis of the mandrel, and rotates while the one or more rollers contact the fiber tows disposed on the mandrel.

7. The apparatus according to claim 4, wherein the mandrel and the bearing element undergo relative translational displacement with respect to one another as the one or more rollers contact the fiber tows disposed on the mandrel.

8. The apparatus according to claim 1 wherein, as the mandrel and the diaphragm element continue to undergo relative translational displacement with respect to one another, the control logic is programmed to control the actuator to displace again the one or more displaceable portions and to apply a predetermined pressure to the fiber tows disposed on the mandrel at a different axial location along the mandrel.

9. The apparatus according to claim 1, wherein the heating element:
   comprises a ring that surrounds and is disposed concentrically with respect to the mandrel; and
   directs heat radially inwardly toward the mandrel.

10. An apparatus for winding fiber tows to form a structure, the apparatus comprising:
    a carrier with spools of fiber mounted thereon, wherein the spools of fiber provide the fiber tows to form the structure;

a mandrel;

a guide element that directs the fiber tows from the spools of fiber onto the mandrel;

a heating ring that:
  surrounds and is disposed concentrically with respect to the mandrel; and
  directs heat radially inwardly toward the mandrel;

an iris diaphragm that defines an orifice about the mandrel;

the iris diaphragm including a plurality of blades that are displaceable in a radial direction with respect to the mandrel and that selectively displace to:
  open and close at a predetermined rate to vary a diameter of the orifice; and
  apply a predetermined pressure to the fiber tows disposed on the mandrel;

an actuator that actuates the plurality of blades;

control logic that controls the actuator to selectively open and close the plurality of blades as the mandrel and the iris diaphragm undergo relative translational displacement with respect to one another;

wherein the control logic, in controlling the actuator to selectively open and close the plurality of blades, takes into account a relative translational speed between the mandrel and the iris diaphragm, via inputs comprising a detected or calculated position of the mandrel with respect to the iris diaphragm; and a bearing element that is concentric with respect to the mandrel and disposed about the mandrel;

wherein the bearing element includes a plurality of rollers that contact the fiber tows disposed on the mandrel, after the blades of the iris diaphragm apply the predetermined pressure to the fiber tows.

11. The apparatus according to claim 10, wherein:

the bearing element comprises an outer ring, wherein the rollers are mounted on the outer ring; and the rollers are displaceable along a radially inward direction from the outer ring, to contact the fiber tows disposed on the mandrel.

\* \* \* \* \*